United States Patent
Khessib et al.

(10) Patent No.: US 10,839,080 B2
(45) Date of Patent: Nov. 17, 2020

(54) HARDWARE-ENFORCED FIRMWARE SECURITY

(71) Applicant: Microsoft Technology Licensing, LLC, Redmond, WA (US)

(72) Inventors: Badriddine Khessib, Redmond, WA (US); Bryan David Kelly, Carnation, WA (US); Mallik Bulusu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 356 days.

(21) Appl. No.: 15/694,748

(22) Filed: Sep. 1, 2017

(65) Prior Publication Data

US 2019/0073478 A1    Mar. 7, 2019

(51) Int. Cl.
*G06F 21/57* (2013.01)
*G06F 21/70* (2013.01)
(Continued)

(52) U.S. Cl.
CPC .......... *G06F 21/572* (2013.01); *G06F 9/4401* (2013.01); *G06F 13/4072* (2013.01);
(Continued)

(58) Field of Classification Search
None
See application file for complete search history.

(56) References Cited

U.S. PATENT DOCUMENTS 5,734,919 A * 3/1998 Walsh ................... G06F 1/1632
365/185.13
8,832,778 B2 * 9/2014 McCune ................. G06F 21/85
726/1

(Continued)

FOREIGN PATENT DOCUMENTS

WO    2013089726 A1    6/2013
WO    2014039363 A1    3/2014

OTHER PUBLICATIONS

"Secured Boot and Measured Boot: Hardening Early Boot Components Against Malware", Microsoft, Sep. 7, 2012, 10 pp.

(Continued)

*Primary Examiner* — Farid Homayounmehr
*Assistant Examiner* — Olanrewaju J. Bucknor
(74) *Attorney, Agent, or Firm* — Buckley, Maschoff & Talwalkar LLC

(57) ABSTRACT

A Root of Trust hardware hierarchy provides firmware security for motherboard and peripheral devices. Power is received at a computer system and, in response to the receipt of power, of a standby power rail of a motherboard of the computer system is energized, and a first microcontroller mounted on the motherboard authenticates first firmware associated with a baseboard management controller mounted on the motherboard and coupled to the first microcontroller. If the authentication of the first firmware is successful, the baseboard management controller is powered on, a central processing unit coupled to the first microcontroller is held in reset, and a standby power rail of a peripheral component card coupled to the motherboard is energized. Second firmware associated with the central processing unit is authenticated using the first microcontroller and a second microcontroller mounted on the peripheral component card authenticates third firmware associated (Continued)

with a system on chip mounted on the peripheral component card and coupled to the second microcontroller.

13 Claims, 12 Drawing Sheets

(51) Int. Cl.
    *G06F 9/4401*     (2018.01)
    *G06F 13/40*     (2006.01)
    *G06F 13/42*     (2006.01)
    *G06F 21/44*     (2013.01)

(52) U.S. Cl.
    CPC ........ *G06F 13/4282* (2013.01); *G06F 21/575* (2013.01); *G06F 21/70* (2013.01); *G06F 21/44* (2013.01); *G06F 2221/034* (2013.01)

(56) References Cited

U.S. PATENT DOCUMENTS

| | | | | |
|---|---|---|---|---|
| 10,311,224 B1* | 6/2019 | Farhan | .................. | H04L 9/3236 |
| 2004/0117681 A1* | 6/2004 | Mahony | ............... | H05K 7/1457 |
| | | | | 713/330 |
| 2005/0010811 A1* | 1/2005 | Zimmer | ................ | G06F 9/4401 |
| | | | | 726/4 |
| 2008/0320311 A1* | 12/2008 | Cho | ...................... | H04L 9/3247 |
| | | | | 713/187 |
| 2009/0158071 A1* | 6/2009 | Ooi | ......................... | G06F 11/30 |
| | | | | 713/340 |
| 2014/0068275 A1* | 3/2014 | Swanson | ................. | G06F 21/57 |
| | | | | 713/192 |
| 2014/0089712 A1* | 3/2014 | Machnicki | ............... | G06F 1/26 |
| | | | | 713/324 |
| 2014/0115314 A1* | 4/2014 | Huang | .................. | G06F 9/4401 |
| | | | | 713/2 |
| 2014/0289570 A1* | 9/2014 | Lewis | ................. | G06F 11/3089 |
| | | | | 714/43 |
| 2015/0121054 A1* | 4/2015 | Wu | ........................ | G06F 21/575 |
| | | | | 713/2 |
| 2015/0205745 A1* | 7/2015 | Bailey | .................. | G06F 13/385 |
| | | | | 710/315 |
| 2015/0220742 A1* | 8/2015 | Ouyang | ................ | G06F 21/602 |
| | | | | 713/189 |
| 2016/0055332 A1* | 2/2016 | Jeansonne | ............ | G06F 9/4406 |
| | | | | 726/22 |
| 2017/0160777 A1* | 6/2017 | Uan-zo-li | .............. | G06F 1/3206 |
| 2018/0060589 A1* | 3/2018 | Polak | .................... | H04L 63/123 |
| 2018/0121656 A1* | 5/2018 | Scherer, III | .......... | G06F 21/575 |
| 2018/0181757 A1* | 6/2018 | Pappu | .................... | G06F 21/572 |
| 2019/0053290 A1* | 2/2019 | Raju | ................... | H04L 63/0272 |

OTHER PUBLICATIONS

"Secure Boot Overview", Microsoft, Updated: May 5, 2014, 3 pp.
Savagaonkar, Uday "Google Cloud Platform Blog", Aug. 24, 2017, 11 pp.
"International Search Report and Written Opinion Issued in PCT Application No. PCT/US2018/039633", dated Sep. 25, 2018, 15 Pages.

* cited by examiner

HARDWARE-ENFORCED FIRMWARE SECURITY

BACKGROUND

Computer hardware platforms typically include several components which execute dedicated firmware to provide initialization and low-level runtime control thereof. These components may include not only one or more Central Processing Units (CPUs), but also peripheral components mounted on the motherboard and/or on attached peripheral cards.

Firmware security is integral to maintaining the integrity of computer hardware platforms. Firmware attack vectors include host/driver access, network access, power-on and reset, boot and pre-boot, and virtual machine access. Server platforms within modern data centers present additional surfaces for firmware attacks, by allowing third-party applications and operating systems to provision bare metal, and by allowing guest Virtual Machines physical access to a variety of hardware resources (e.g., GPUs, FPGAs, SSDs).

Secure Boot is a system for identifying whether platform boot firmware is trusted by the platform manufacturer. At platform power-on, and prior to execution of boot firmware, a Secure Boot-enabled CPU checks one or more signatures associated with the boot firmware. If all signatures are valid, the platform boots by executing the firmware in the standard manner. If any signature is invalid, the boot process simply terminates. Accordingly, Secure Boot offers neither protection from nor recovery from firmware attacks or corruption. Secure Boot also fails to provide any firmware security for peripheral components.

Systems are desired to efficiently recover from firmware corruption or attacks detected during the boot process. Also desired are firmware security systems offering protection, detection and recovery during runtime. Such security would preferably extend to motherboard CPUs and to firmware-executing peripheral components.

DETAILED DESCRIPTION

The following description is provided to enable any person in the art to make and use the described embodiments. Various modifications, however, will be apparent to those in the art.

Generally, some embodiments provide a hardware-based Root of Trust (RoT) hierarchy for an entire computing platform. Each RoT may comprise a microcontroller unit (MCU) disposed between a protected processing device (e.g., CPU, System On Chip (SOC), MCU, Microprocessor, GPU, FPGA, etc.) and its firmware load store, and tasked with managing the integrity of the firmware in the load store. Each RoT may enforce asymmetric key signature authentication on its associated firmware components during boot. A RoT may store and provide recovery to a known good firmware version in case of authentication failure. A RoT may also enforce secure flash read and write access during runtime based on region protection policies.

During platform power-on, a master RoT may coordinate the delivery of power to host CPUs, Chipset, Baseboard Management Controller and peripherals to ensure the verification of all firmware prior to firmware execution. The power-on sequence may include attestation challenges exchanged between the master RoT and slave RoTs that are local to devices which they protect. The attestation challenges may inform the platform power-on sequence and may also facilitate secure firmware updates.

Figure 1:
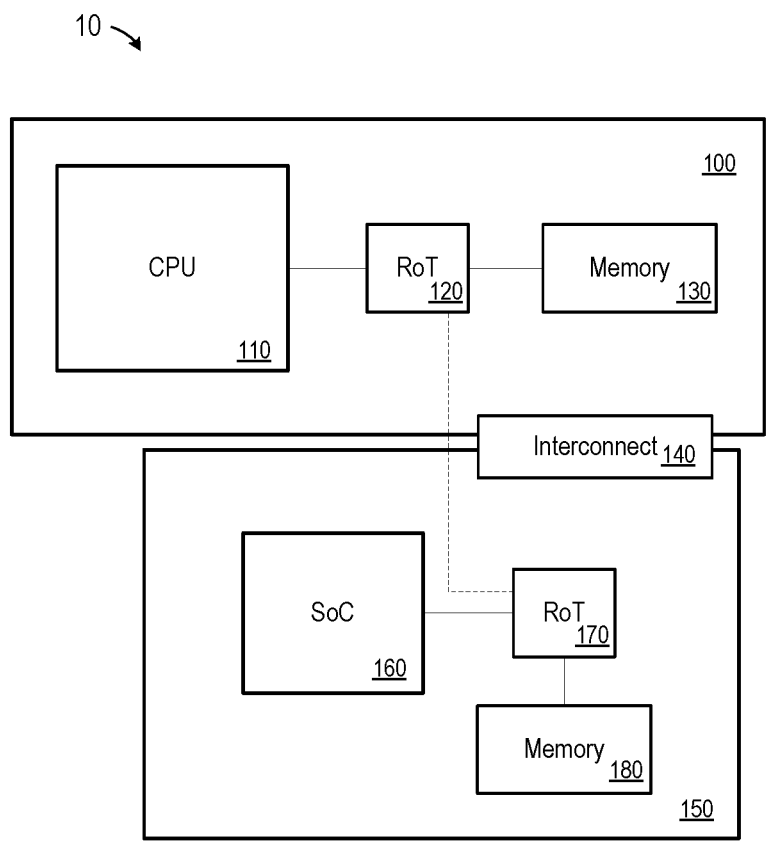
FIG. 1 is a block diagram of a hardware architecture according to some embodiments.

FIG. 1 is a block diagram of a hardware architecture of computing system 10 according to some embodiments. Computing system 10 comprises motherboard 100 and add-in card 150. Computing system 10 may represent any type of computing platform or form factor that is or becomes known, including but not limited to a rack server, a server tower, a desktop computer, a laptop computer, a tablet computer, a smartphone, a wearable device, etc.

CPU 110, RoT 120 and memory 130 are mounted to motherboard 100. According to some embodiments, motherboard 100 electrically connects CPU 110, RoT 120 and memory 130 to provide communication therebetween as described herein. Motherboard 100 also provides power to CPU 110, RoT 120 and memory 130 for operation as described herein. Motherboard 100 may support other discrete components and integrated circuit devices as is known in the art. Motherboard 100 and the components mounted thereon are also supported by power supply and cooling components as is known in the art.

CPU 110 may comprise any type of CPU and/or other processing device capable of executing firmware (e.g., System On Chip (SOC), MCU, Microprocessor). RoT 120 may comprise an MCU or any other logic device capable of performing the functions attributed thereto herein. According to some embodiments, RoT 120 comprises an Advanced RISC Machine (ARM) controller. A general architecture of RoT 120 according to some embodiments will be described below with respect to FIG. 9.

Memory 130 may comprise one or more flash memory devices to store firmware for execution by CPU 110. CPU 110 may be configured to communicate with memory 130 to retrieve firmware stored therein. For example, CPU 110 may be configured to request and retrieve firmware over a standard variant of the Serial Peripheral Interface (SPI, eSPI, QSPI).

According to some embodiments, RoT 120 presents an eSPI/QSPI flash interface to CPU 110. RoT 120 may therefore intercept a firmware request from CPU 110 and mediate the provision of firmware to CPU 110 as described herein. Such operation may be transparent to CPU 110, which may operate in a conventional manner to request, retrieve and execute firmware at pre-boot and boot.

RoT 120 is able to control all reads and writes to memory 130 by CPU 110. This ability allows RoT 120 to enforce authenticated writes and policy-based memory region access during runtime as will be described below. Moreover, memory 130 is not limited to flash memory, but rather to any memory devices having a common communication interface with RoT 120.

Peripheral component card 150 is electrically coupled to motherboard 100 via interconnect 140. Peripheral components according to the present description may comprise add-in cards and peripherals that contain processors, microcontrollers or devices that execute soft-logic. Interconnect 140 may comprise a Peripheral Component Interconnect or Peripheral Component Interconnect express connector, but embodiments are not limited thereto.

Peripheral component card 150 includes SoC 160, RoT 170 and memory 180. Motherboard 100 provides power to peripheral component card 150 (and therefore to its mounted components) for operation as described herein. Peripheral component card 150 may support other discrete components and integrated circuit devices as is known in the art, including, for example, other connectors and cooling components.

SoC 160 may comprise an integrated circuit which integrates a microcontroller (or microprocessor) with advanced peripherals. RoT 170 may comprise an MCU or any other logic device capable of performing the functions attributed thereto herein. Memory 180 may comprise one or more flash memory devices to store firmware for execution by SoC 160. As described above with respect to the components of motherboard 100, RoT 170 may present an eSPI/SPI/QSPI flash interface to SoC 160, intercept firmware requests and mediate the provision of firmware to SoC 160. This operation may be transparent to SoC 160.

RoT 170 is also able to control all reads and writes to memory 180 by SoC 160. RoT 170 may therefore enforce authenticated writes and policy-based memory region access during runtime as mentioned above with respect to RoT 120. Memory 180 may comprise any memory device having a common communication interface with RoT 170.

According to some embodiments, RoT 170 receives attestation challenges from RoT 120 and, in response, attempts to authenticate firmware stored in memory 180. SoC 160 is not allowed to boot if the authentication is unsuccessful. The booting of SoC 160 may be controlled by controlling the power rails of card 150 as will be described herein.

Embodiments may include more than one CPU on motherboard 100, and one or more other devices protected by RoT 120 on motherboard 100. Embodiments may also or alternatively include one or more other peripheral component cards, one or more of which include a RoT device operating as described herein.

Figure 2:
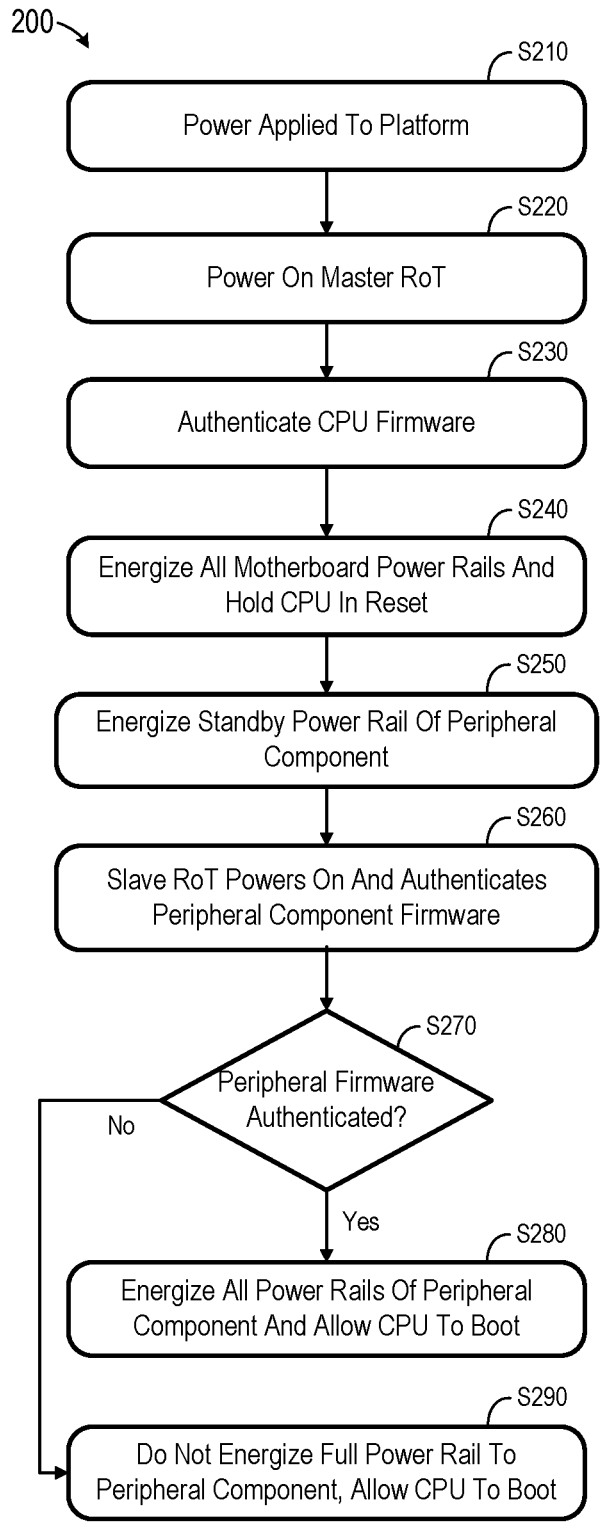
FIG. 2 is a flow diagram of a process to boot a platform and a peripheral component according to some embodiments.

FIG. 2 is a flow diagram of process 200 according to some embodiments. Generally, process 200 is executed to enforce firmware security in a computing platform including firmware-executing peripheral components.

Initially, at S210, power is applied to a computing platform. S210 may comprise switching a main power supply to an "On" position. The computing platform may be receiving standby power and/or battery power (e.g., to power a Real Time Clock) prior to S210.

In a conventional computing system, when voltage is first applied to a computing platform, the power passes through in-rush circuitry to a Complex Programmable Logic Device (CPLD). The CPU is off while the CPLD ensures that the power rails (e.g., 3.3V, +SV, +12V) of the platform are energized in a time-sensitive sequence. The sequence ensures that a lower-voltage power rail is stable before a next-highest voltage power rail is energized. As the power-on sequence progresses towards final stages, the CPU and other powered components are held in reset. A power good signal is asserted once the highest-voltage power rail is stable, which causes the CPU to come out of reset and begin booting. All other active devices also boot at this time, including and SoCs/MCUs located on the motherboard or on a peripheral component card.

Continuing with the conventional arrangement, the CPU boots by executing its internal Read-Only Memory (ROM) code. Execution of the ROM code causes the CPU to acquire boot firmware from an external memory (e.g., a flash memory mounted to the motherboard) and to execute the firmware. As described above, the CPU may implement the Secure Boot system to verify the boot firmware prior to execution. If the firmware cannot be verified, the boot process fails.

Returning to process 200, and according to some embodiments, only the motherboard RoT is initially powered at S220. For purposes of the present description, the RoT located on the motherboard and associated with the CPU will be referred to as the master RoT, while a RoT associated with a peripheral component will be referred to as a slave RoT. As will be described below, certain hierarchical architectures may include a RoT which functions as a master and as a slave.

Process 200 will be described in conjunction with system 10 of FIG. 1, but implementations of process 200 are not limited thereto. Accordingly, master RoT 120 is initially powered on at S220. In response, master RoT 120 securely loads and decompresses its internal firmware, while all other active devices remain in a standby or off state.

Next, the CPU firmware is authenticated at S230. The firmware of CPU 110 is stored in memory 130. A system for performing this authentication will be described below.

After authenticating the CPU firmware, all the motherboard power rails are energized and the CPU is held in reset at S240. After (or during) S230 and S240, RoT 120 sequences standby power to peripheral component interconnect 140 at S250. The standby power (e.g., an energized +3.3V rail of card 150) causes slave RoT 170 to power on at S260 and authenticate the firmware of SoC 160 stored in memory 180. Slave RoT 170 resides on the +3.3v rail of peripheral component card 150, thus enabling the powering of RoT 170 before SoC 160 during power-on and hot-plug scenarios. Sequencing of the power rails as described with respect to process 200 may be controlled by a CPLD in coordination with the motherboard RoT.

At S270, RoT 120 determines whether the firmware of SoC 160 has been authenticated. S270 may comprise waiting to receive an authentication measurement from RoT 170. The authentication measurement may comprise a response to an authentication challenge issued by master RoT 120, and may indicate that the firmware of memory 180 has been verified. The measurement may include additional information which will be described below. Communication of the challenge/measurement between RoT 120 and RoT 170 is represented by a dotted line in FIG. 1. This communication may proceed over an I²C interface, which typically exists between a motherboard and PCI devices for monitoring the temperature of add-in cards.

Flow proceeds from S270 to S280 if it is determined that the integrity of the peripheral firmware has been verified. At S280, all power rails of the peripheral component card are energized, allowing SoC 160 to boot the firmware of memory 180. CPU 110 is also allowed to boot the verified firmware of memory 130, for example by de-asserting the Reset signal.

It may be determined at S270 that the peripheral firmware has not been authenticated because no authentication measurement is received from RoT 170. Alternatively, an authentication measurement may be received but may indicate that the firmware could not be authenticated. In either case, CPU 110 is allowed to come out of reset and boot at S290, but full power is not applied to the peripheral component card. In some embodiments, and based on platform policies, neither SoC 160 nor CPU 110 are allowed to boot at S290 if the determination at S270 is negative.

In a case that system 10 includes more than one peripheral component card such as card 150, the standby power rails of each card are powered on at S250 and a RoT on each card authenticates its respective firmware at S260. If fewer than all peripheral components report that their firmware has been successfully authenticated, then, in some embodiments, full power is provided to those peripheral components which have reported verified firmware and the CPU is allowed to come out of reset and boot. In other embodiments, no peripheral components nor the CPU are allowed to boot.

Process 200 assumes that the CPU firmware is successfully authenticated at S230. According to some embodiments, process 200 terminates if the authentication is unsuccessful. However, as will be described below, some embodiments provide for recovery in a case that the authentication at S230, or any of the one or more authentications at S270, is unsuccessful.

Figure 3:
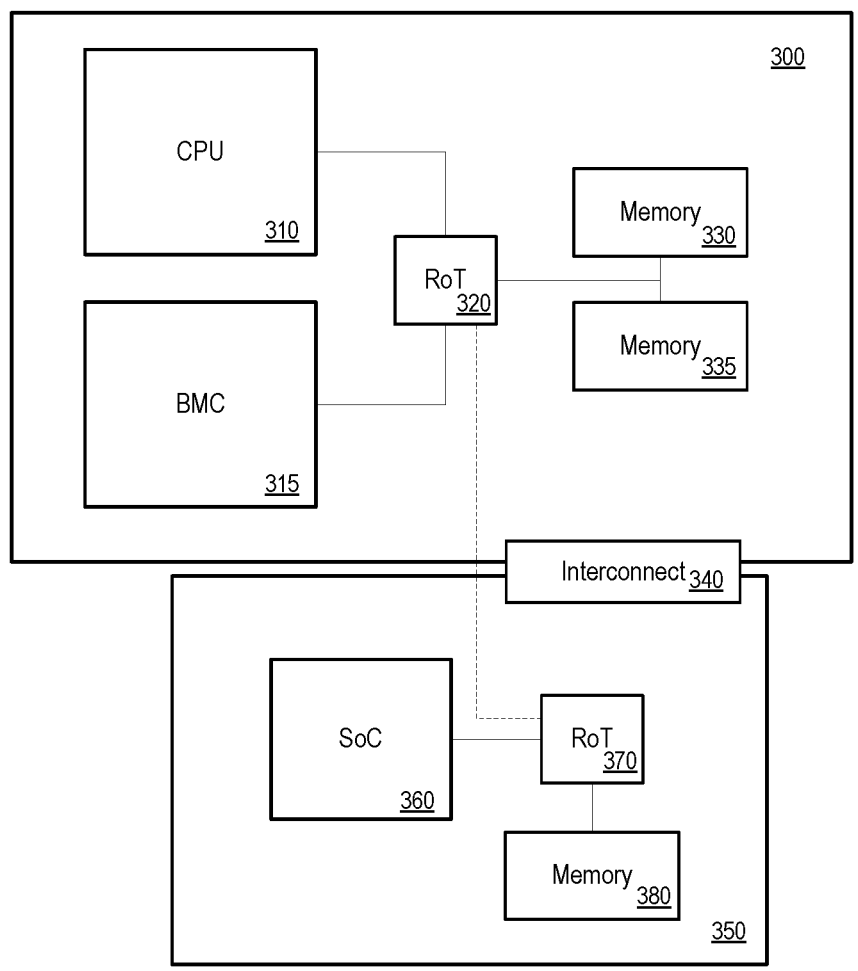
FIG. 3 is a block diagram of a hardware architecture according to some embodiments.

FIG. 3 is a block diagram of system 30 according to some embodiments. System 30 includes motherboard 300, interconnect 340 and peripheral component card 350. System 30 is identical to system 10 of FIG. 1 except for the inclusion of Baseboard Management Controller (BMC) 315 and memory 335.

As is known in the art, BMC 315 may manage an interface between system management software (not shown) and the hardware of system 30. BMC 315 monitors sensors of system 30 and may send alerts to a system administrator via an out-of-band network connection if any measurements indicate a potential issue with system 30. The system administrator may also remotely communicate with BMC 315 via the out-of-band connection to take corrective actions, such as resetting or power cycling system 30. Accordingly, system 30 may comprise a managed hardware server according to some embodiments, Memory 335 may comprise a flash memory device to store firmware of BMC 315. RoT 320 may operate to verify the integrity of the firmware of BMC 315 and gate read/write access of BMC 315 to memory 335. Memory 335 is not limited to flash memory, but may comprise any memory device having a communication interface in common with RoT 320. Moreover, since CPU 310 and BMC 315 both access their respective firmware through RoT 320, memory 330 and memory 335 need not be physically separated and may be implemented by one (or more) memory devices.

Figure 4:
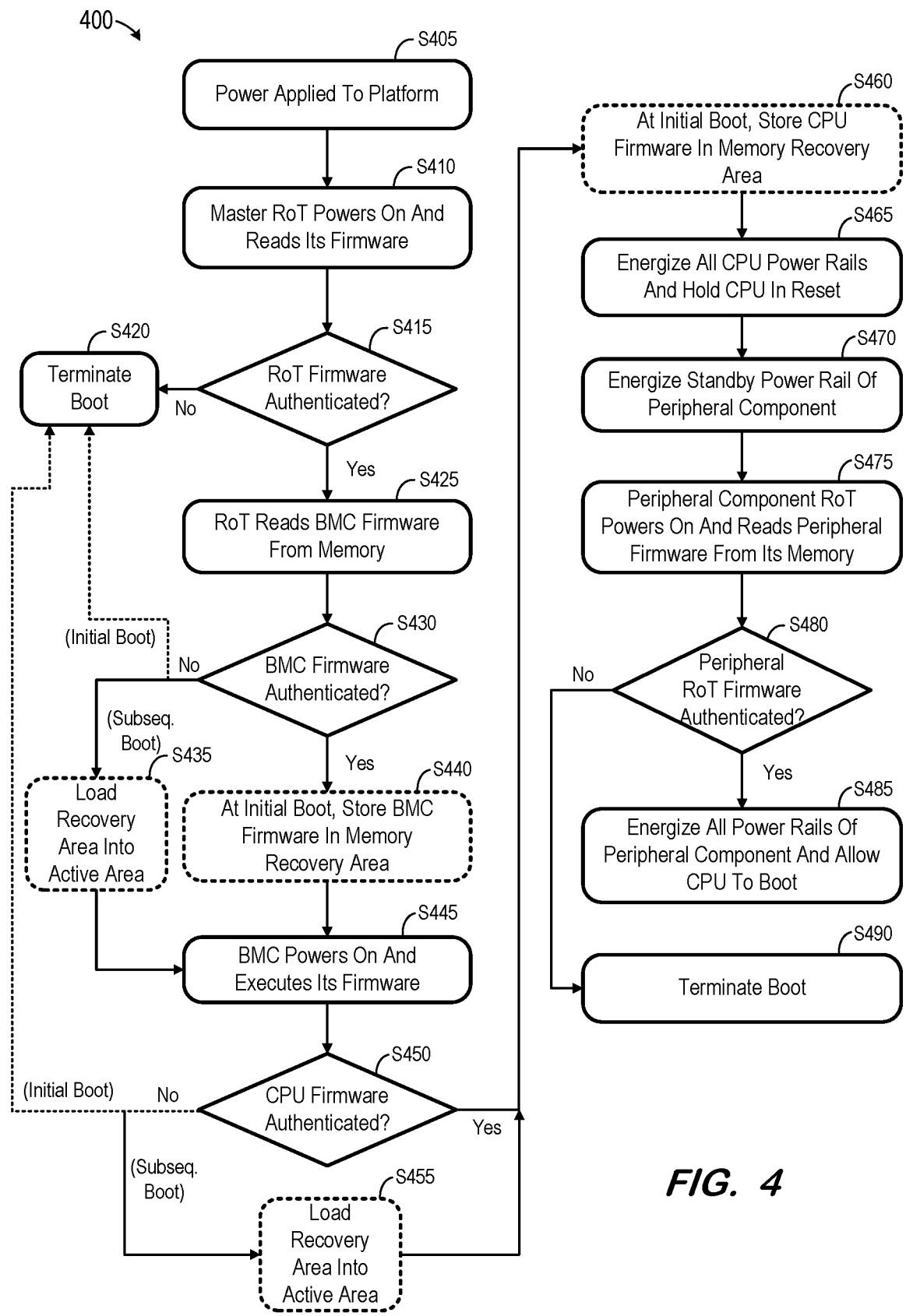
FIG. 4 is a flow diagram of a process to boot a platform and a peripheral component according to some embodiments.

FIG. 4 is a flow diagram of process 400 according to some embodiments. Process 400 may be executed to enforce firmware security in a computing platform including a BMC and firmware-executing peripheral components. Accordingly, process 400 will be described with respect to system 30 of FIG. 3, although implementations of process 400 are not limited thereto.

As described with respect to S210, power is applied to the platform at S405. Next, at S410, master RoT 320 powers on and securely loads and decompresses its internal firmware stored in its ROM bootloader. In the meantime, all other active devices remain in a standby or off state. The ROM bootloader authenticates the flash of RoT 320 at S415. Authentication may comprise by verifying the firmware integrity against an RSA asymmetric key-signed signature as will be described below with respect to FIGS. 5 and 6.

The boot process terminates at S420 if the firmware of RoT 320 fails authentication. If authentication is successful, RoT 320 reads the firmware associated with BMC 315 from memory 335 at S425. According to some embodiments, RoT 320 reads the firmware from an "active" area of memory 335 into its secure SRAM using secure Direct Memory Access. This firmware is authenticated at S430. Authentication at S430 may be performed similarly to the authentication at S415.

If the authentication of the BMC firmware is unsuccessful at initial boot-up of system 30, the boot process terminates at S420. According to some embodiments, system 30 the boot process does not terminate at S420 but rather proceeds in a policy-driven safe or untrusted mode, including policy-driven notifications and remediations. If the authentication is unsuccessful during a subsequent boot, data stored in a recovery area of memory 335 is loaded into the active area of memory 335 at S435 and the authentication is performed again based on the firmware stored in the active area. The data stored in the recovery area is a prior authenticated version of the BMC firmware.

In this regard, if the BMC firmware is authenticated at S430 and system 30 is booting for the first time (i.e., at initial boot), the authenticated BMC firmware is copied from the active area to the recovery area of memory 335 at S440. The recovery area is provisioned and is locked from further writes by RoT 320 at S440. Accordingly, and referring back to S435, the firmware of the recovery area may be used to recover from future failures to authenticate the BMC firmware stored in the active area of memory 335. The various areas of firmware memory according to some embodiments will be described further below with respect to FIG. 10.

Following S440, or if the successful authentication at S430 occurs during a boot subsequent to initial boot, RoT 320 pre-fetches the boot block of memory 335 for BMC 315 and signals for power-on of BMC 315 at S445. BMC 315 therefore powers on and begins executing its authenticated firmware. Powering-on of BMC 315 allows for communicating any subsequent attestation failures during boot-up or runtime to the data center management software via the above-mentioned out-of-band communication channel.

Next, the CPU firmware stored in memory 330 is authenticated at S450. As described with respect to authentication of the BMC firmware, if the authentication of the CPU firmware is unsuccessful at initial boot-up of system 30, the boot process terminates at S420. If the authentication of the CPU firmware is unsuccessful during a subsequent boot, data stored in a recovery area of memory 330 is loaded into an active area of memory 330 at S455 and the authentication process is repeated. As described with respect to the BMC firmware, if the CPU firmware is authenticated at S450 and system 30 is at initial boot, the authenticated CPU firmware is copied to a recovery area of memory 330 at S460. This recovery area may also be provisioned and locked from further writes by RoT 320.

At S465, the motherboard power rails are energized and CPU 310 is held in reset. RoT 320 then energizes the standby power rail of peripheral component card 350 via peripheral component interconnect 340 at S470. The standby power causes slave RoT 370 to power on at S475 and read the firmware of its protected device (i.e., SoC 360) stored in memory 380.

At S480, RoT 320 determines whether the firmware of SoC 360 has been authenticated. As described with respect to S270 of process 200, S480 may comprise waiting to receive an authentication measurement from RoT 370, which may comprise a response to an authentication challenge issued by master RoT 320. The measurement may include additional information which will be described below. Communication of the challenge/measurement between RoT 320 and RoT 370 is represented by a dotted line in FIG. 3, and may proceed over the I²C bus, which is powered by the +3.3V standby rail.

Flow proceeds from S480 to S485 if the peripheral firmware has been successfully authenticated. At S285, all power rails of the peripheral component card are energized, allowing SoC 360 to boot the firmware of memory 380. CPU 310 is also taken out of reset and allowed to boot the firmware of memory 330. The power sequencing and signaling may be performed by RoT 320 in coordination with a CPLD mounted on motherboard 300.

If it is determined at S480 that the peripheral firmware has not been authenticated (either because no authentication measurement is received from RoT 370, or because a received authentication measurement indicates that the firmware could not be authenticated), the boot process is terminated at S490. In some embodiments, and based on platform policies, CPU 310 is allowed to come out of reset and boot at S490, but full power is not applied to peripheral component card 305.

S470 through S480 may execute contemporaneously with S450 through S465 according to some embodiments. That is, the integrity of the CPU firmware may be checked while the integrity of the peripheral component firmware is being checked.

In a case that system 30 includes more than one peripheral component card, the standby power rails of each card are powered on at S470 and a RoT on each card authenticates its respective firmware at S480. If fewer than all peripheral components report that their firmware has been successfully authenticated, then, in some embodiments, full power is provided to those peripheral components which have reported verified firmware and the CPU is allowed to come out of reset and boot. In other embodiments, no peripheral components nor the CPU are allowed to boot.

According to some embodiments, memory 380 also includes a recovery area. As described above, the recovery area may be provisioned and loaded with authenticated firmware (e.g., at first successful boot) and locked from further writes. Master RoT 320 may instruct slave RoT 370 to load firmware from the recovery area in a case that the firmware of the active area cannot be authenticated at S480. If this loading is successful, flow may proceed to S485 to complete the boot process.

Figure 5:
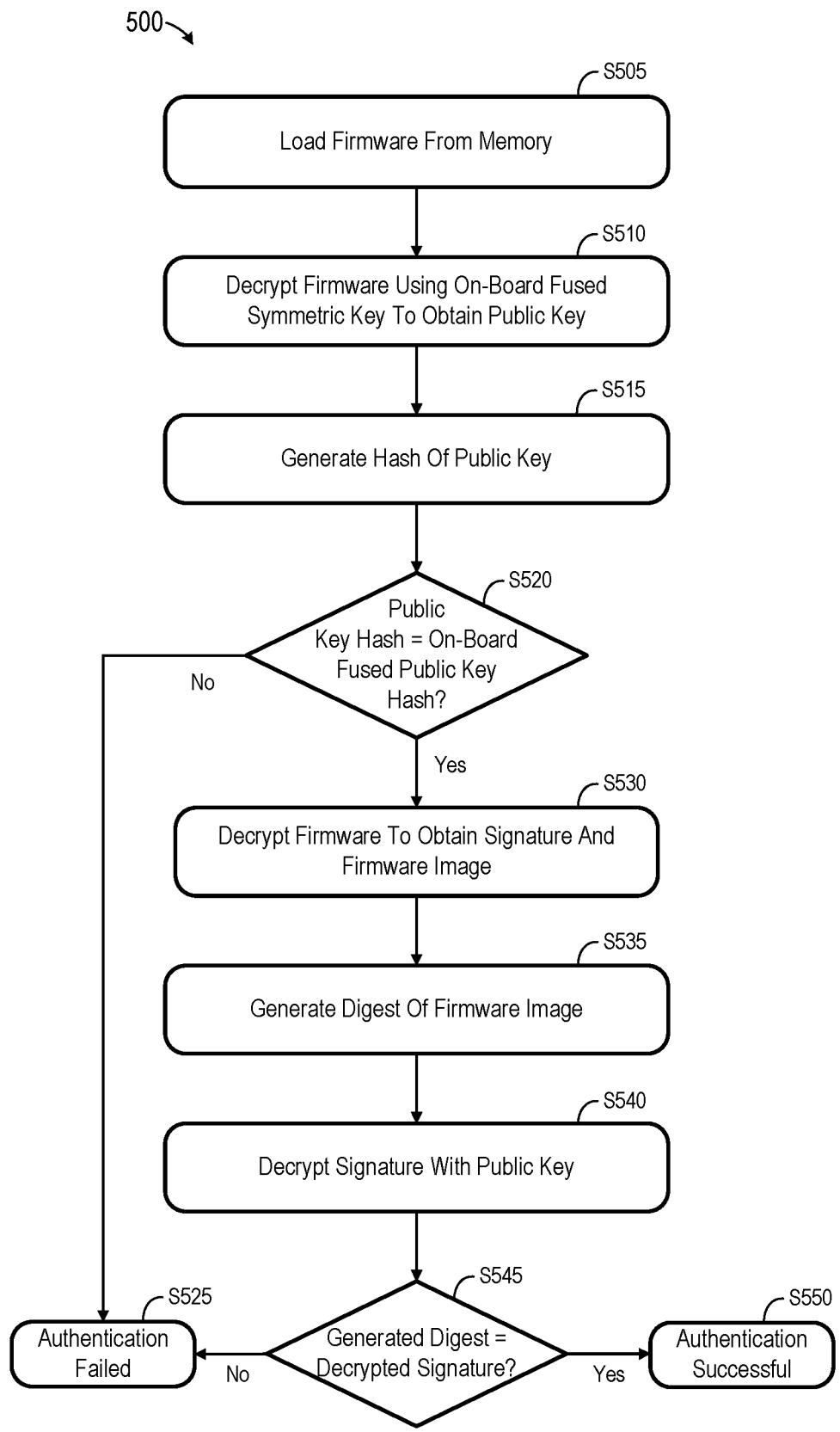
FIG. 5 is a flow diagram of a process to authenticate a firmware image according to some embodiments.

FIG. 5 is a flow diagram of process 500 to authenticate firmware according to some embodiments. Process 500 may be executed by a RoT to authenticate its own firmware, BMC firmware, CPU firmware, and/or peripheral component firmware as described herein.

Figure 6:
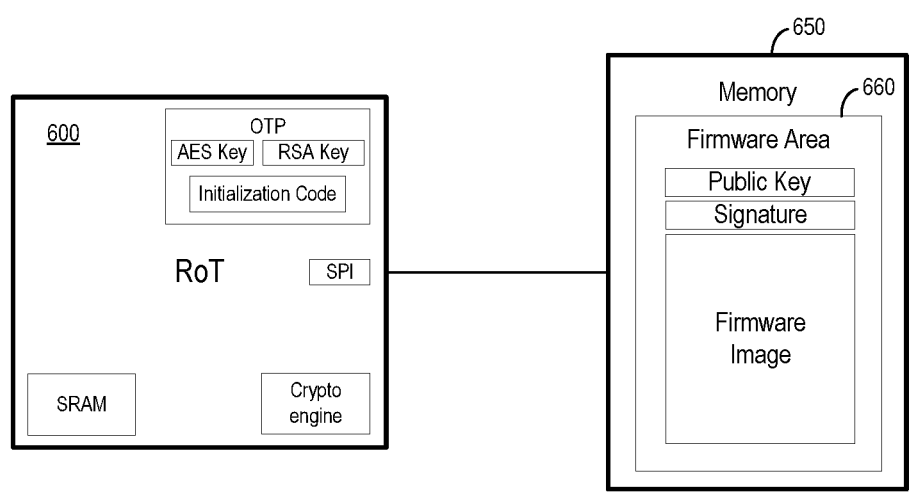
FIG. 6 is a block diagram to illustrate authentication of a firmware image according to some embodiments.

FIG. 6 illustrates RoT 600 and memory 650 for the purpose of describing some embodiments of process 500. Several elements of RoT 600 are illustrated to assist the description. Embodiments are not limited to the illustrated elements.

RoT 600 includes One-Time Programmable (OTP) memory into which are fused a symmetric key (e.g., an Advanced Encryption Standard (AES) key), an asymmetric key (e.g., a hash of an RSA public key) and initialization code. The symmetric key may be used by a trusted platform vendor to encrypt firmware and by RoT 600 to decrypt firmware as described below. The asymmetric key may be a public key of an asymmetric key pair, of which the private key is used by the platform vendor to sign trusted firmware. The fused information cannot be overwritten or altered during platform operation. RoT 600 also includes secure SRAM for generating digests of unverified firmware and a crypto engine for decrypting firmware and firmware signatures.

RoT 600 of FIG. 6 includes an SPI interface to memory 650, but embodiments are not limited thereto. As mentioned above, RoT 600 may include an SPI interface for intercepting communications from an on-board CPU or BMC and intended for their respective flash memory, but may include any other suitable interface for communicating with any memory suitable for storing firmware.

Memory 650 includes firmware area 660. As described herein, firmware area 660 may be provisioned by RoT 600 to include several areas, each of which is associated with different read and write access policies. According to the illustrated embodiment, firmware area 660 is an active area and includes a public key, a signature and a firmware image. The public key, signature and firmware image are encrypted by a symmetric key, but embodiments are not limited thereto. The signature is a digest of the firmware image after encryption by the aforementioned private asymmetric key.

At S505 of process 500, RoT 600 loads the firmware from the active area of memory 650. The firmware may comprise the firmware of any device protected by the RoT, including the RoT itself. The header of the firmware block is decrypted at S510 using the symmetric key fused into RoT 600 to obtain a public key. A hash of the public key is generated at S515. At S520, it is determined whether the hash generated at S515 is identical to the asymmetric public key hash fused into RoT 600.

If it is determined that the generated hash is not identical to the fused hash, flow proceeds to S525 to execute any suitable processes for handling firmware authentication failure. These processes may include notification and/or recovery processes, and may depend upon the device associated with the unauthenticated firmware, the position of the failed authentication in the boot sequence, and/or whether the authentication occurred at boot, runtime or during a firmware update.

If the generated hash is identical to the fused hash, a next portion of the firmware is decrypted using the fused symmetric key to obtain a signature and a firmware image. The decrypted signature and firmware image may be loaded into secure SRAM of RoT 600.

RoT 600 generates a digest, or checksum, of the decrypted firmware image at S535. The decrypted signature is then decrypted using the fused asymmetric public key at S540. If the signature was created using a private key corresponding to the fused asymmetric public key, then the decrypted signature will be identical to the digest generated at S535. Accordingly, if the generated digest is determined to be identical to the decrypted signature at S545, the authentication is deemed successful and flow proceeds to S550 to continue operation in accordance with the successful authentication.

Some embodiments support multi-stage boot and firmware revocation using a key manifest. In such embodiments, the firmware may include a signed key manifest immediately after the public key header. The key manifest is authenticated as described above, and the keys of the key manifest are used to successively verify additional signed firmware images within the active memory area.

Figure 7:
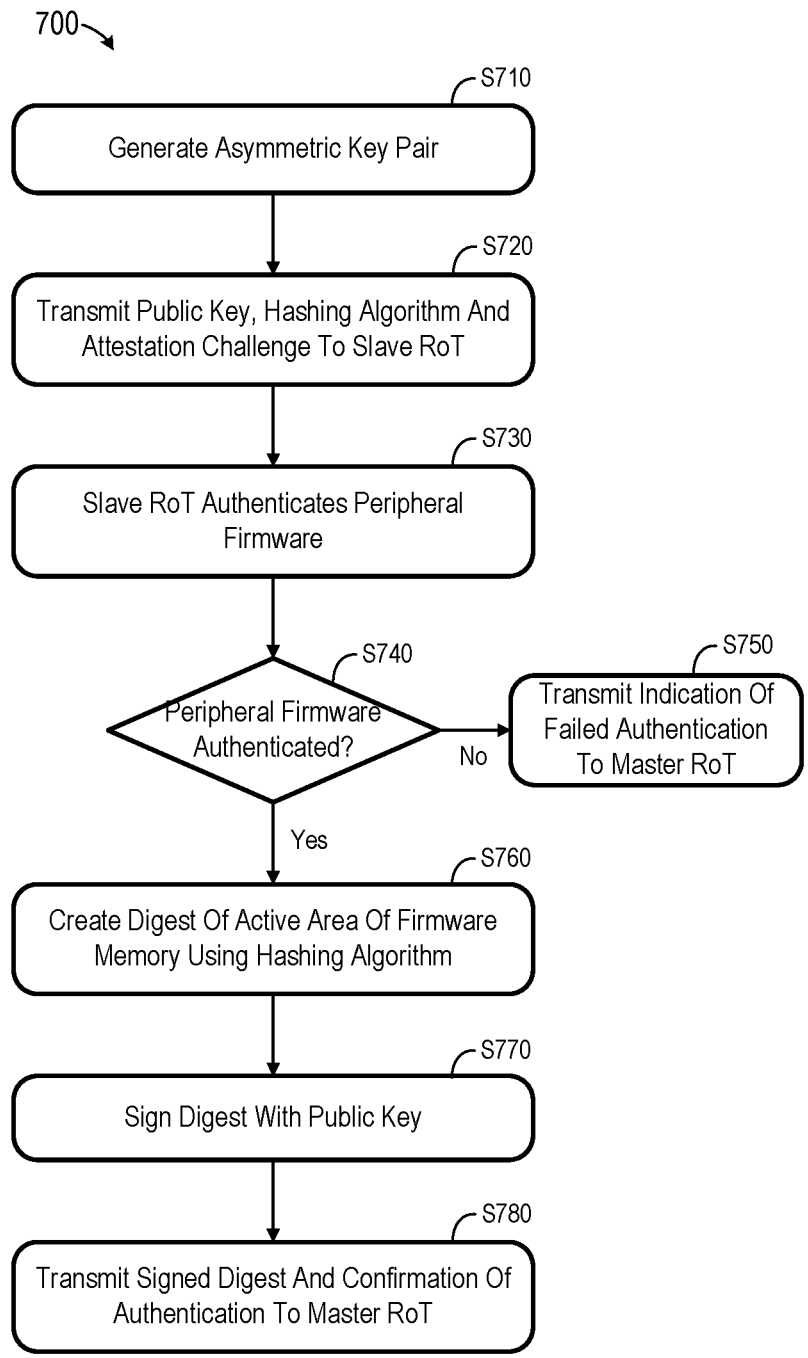
FIG. 7 is a flow diagram of a process to execute an attestation challenge according to some embodiments.

As described above, some embodiments provide hierarchical communication between master and slave RoTs. This communication may proceed over I²C while only the standby power rails are energized, thereby allowing verification of firmware integrity prior to boot of protected active components. FIG. 7 is a flow diagram of process 700 of communication between RoTs according to some embodiments. Specifically, process 700 describes an attestation challenge and response according to some embodiments. An attestation challenge according to process 700 may occur during pre-boot (e.g., at S270 or S480) or during runtime.

A master RoT generates an asymmetric key pair at S710. Therefore, according to some embodiments, a master RoT is capable of generating a secure private asymmetric key unique to the platform. The private key may be inaccessible outside of a designated region of SRAM on the master RoT, and may be only accessible to the crypto engine of the master RoT.

At S720, the master RoT (e.g., RoT 320) transmits an attestation challenge to a slave RoT (e.g., RoT 370). Also transmitted at S720 are a public key derived from the intrinsic private key and a hashing algorithm. Process 700 is described with respect to one slave RoT, however a master RoT may be associated with more than one slave RoT and may therefore transmit the information at S720 to each slave RoT. Each slave RoT may then operate as described with respect to process 700.

Next, at S730, the slave RoT authenticates its peripheral firmware. S730 may proceed as described above with respect to process 500. If the authentication is unsuccessful, the slave RoT transmits an indication of the failed authentication to the master RoT at S750. For example, at S730, RoT 370 authenticates the firmware of SoC 360 stored in memory 380. If the authentication is unsuccessful, RoT 370 transmits an indication thereof to master RoT 320 on motherboard 300.

If the authentication is successful, the slave RoT creates a digest of the active area of the firmware at S760, using the hashing algorithm received at S720. The slave RoT signs the digest using the public key at S770. Next, a S780, the slave RoT sends the signed digest and confirmation of successful authentication to the master RoT.

The master RoT may use the received information to determine whether to apply full power to the peripheral device protected by the slave RoT. The signed digest, which can only be decrypted by the master RoT, may be stored and used by the master RoT to determine whether the peripheral firmware changes in the future. For example, during a subsequent boot, RoT 370 may return a signed digest and confirmation of authentication at S780 as described above. If, after decryption, the digest does not match a prior digest returned by RoT 370, RoT 370 may note the firmware change in its logs, transmit a notification to a system management device via the network connection of BMC 315 and/or take other remedial action.

According to some embodiments, S760-S780 also comprise creating and returning signed digests of the recovery area (if any) and the inactive area of the memory protected by the slave RoT. The master RoT may maintain a table of these digests for each slave RoT coupled thereto. Accordingly, as a result of each attestation challenge, the master RoT may determine whether the inactive area and recovery area of each protected memory device have remained unchanged. This attack/corruption detection mechanism is in addition to the RoT's protection mechanism of write and read-protecting each of the memory areas during boot and runtime in accordance with their respective access restriction policies.

Figure 8:
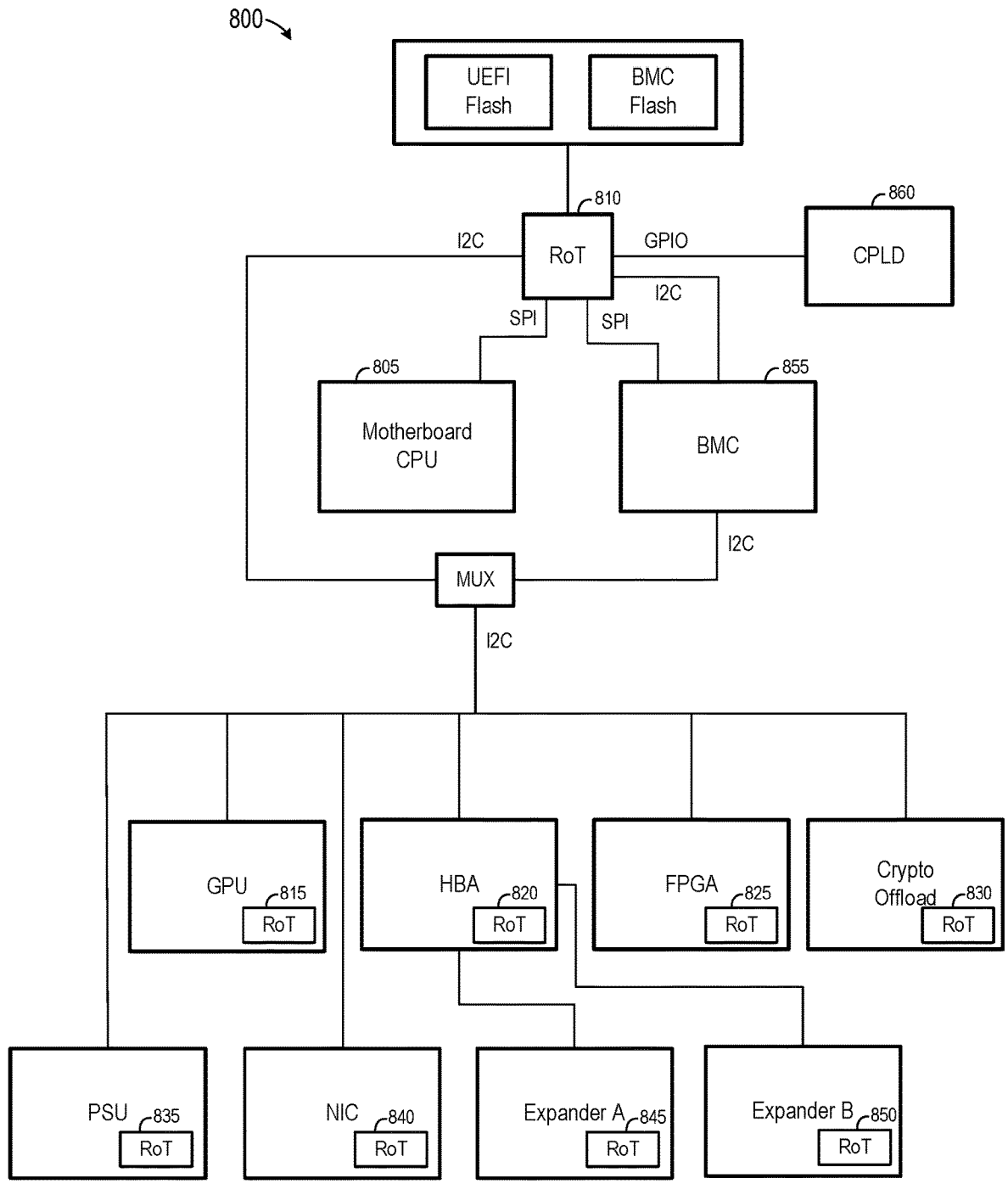
FIG. 8 is a block diagram of a hardware architecture according to some embodiments.

FIG. 8 illustrates communication channels between master and slave RoTs of computing system 800 according to some embodiments. Motherboard RoT 810 protects motherboard CPU 805 and BMC 855, while RoTs 815 through 850 protect various peripheral active components. As described above, system 800 includes I²C lanes routed to all active components. These I²C lanes are typically used by BMC 855 for thermal monitoring of active components. In the case of system 800, the I²C lanes are first used by RoT 810 during boot and pre-boot, and are then mux-switched to BMC 855 for thermal management. According to some embodiments, RoT 810 can request for BMC 855 to yield control of the I²C for runtime attestation challenges.

RoT 810 is coupled to CPLD 860 to control power sequencing as described herein. RoT 810 operates as a master RoT and is the head of the hierarchical root of trust platform design described herein. As mentioned with respect to process 700, RoT 810 may store an attestable hash of all platform firmware memory areas.

Each of RoTs 815 through 850 can be configured to operate as a slave, or as a slave and a master. Bus arbitration is not required, as master and slave operations are hierarchically defined. RoT 820 of system 800 is configured as slave and master, because it lies downstream from RoT 810 and upstream from RoTs 845 and 850. RoT 820 is a slave to RoT 810 and therefore responds to attestation challenges received from RoT 810. RoT 820 is a master to RoTs 845 and 850 and therefore issues attestation challenges thereto and stores firmware digests thereof. According to some embodiments, results of the attestation challenges to RoTs 845 and 850, as well as their encrypted digests, are rolled up to RoT 810 via RoT 820.

Figure 9:
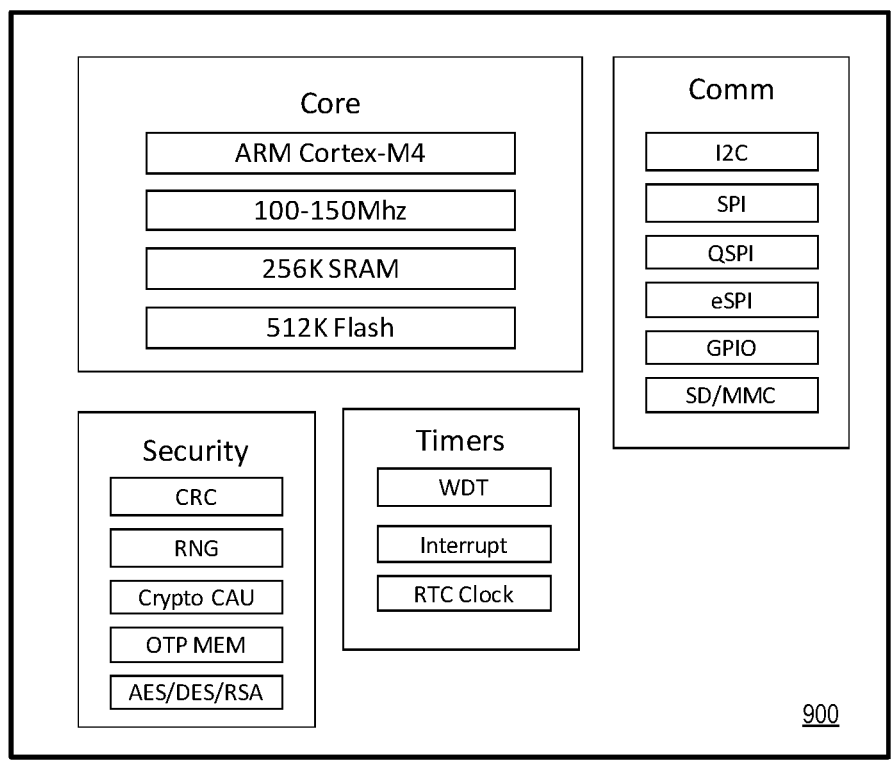
FIG. 9 is a block diagram of a controller architecture according to some embodiments.

FIG. 9 is a block diagram of the internal architecture of RoT 900 according to some embodiments. RoT 900 may comprise an ARM controller including secure SRAM and internal flash memory. OTP Memory may include an OTP memory to store a public key SHA2-512 hash, and an OTP memory to store an AES key, for example. These keys are inaccessible outside of secure memory. RoT 900 also includes a crypto engine as mentioned above, and Cyclic Redundancy Check and random number generation functionality. RoT 900 also supports the I²C, SPI and GPIO interfaces mentioned herein, as well a Secure Digital/MultiMediaCard interface to interface with removable flash memory.

Figure 10:
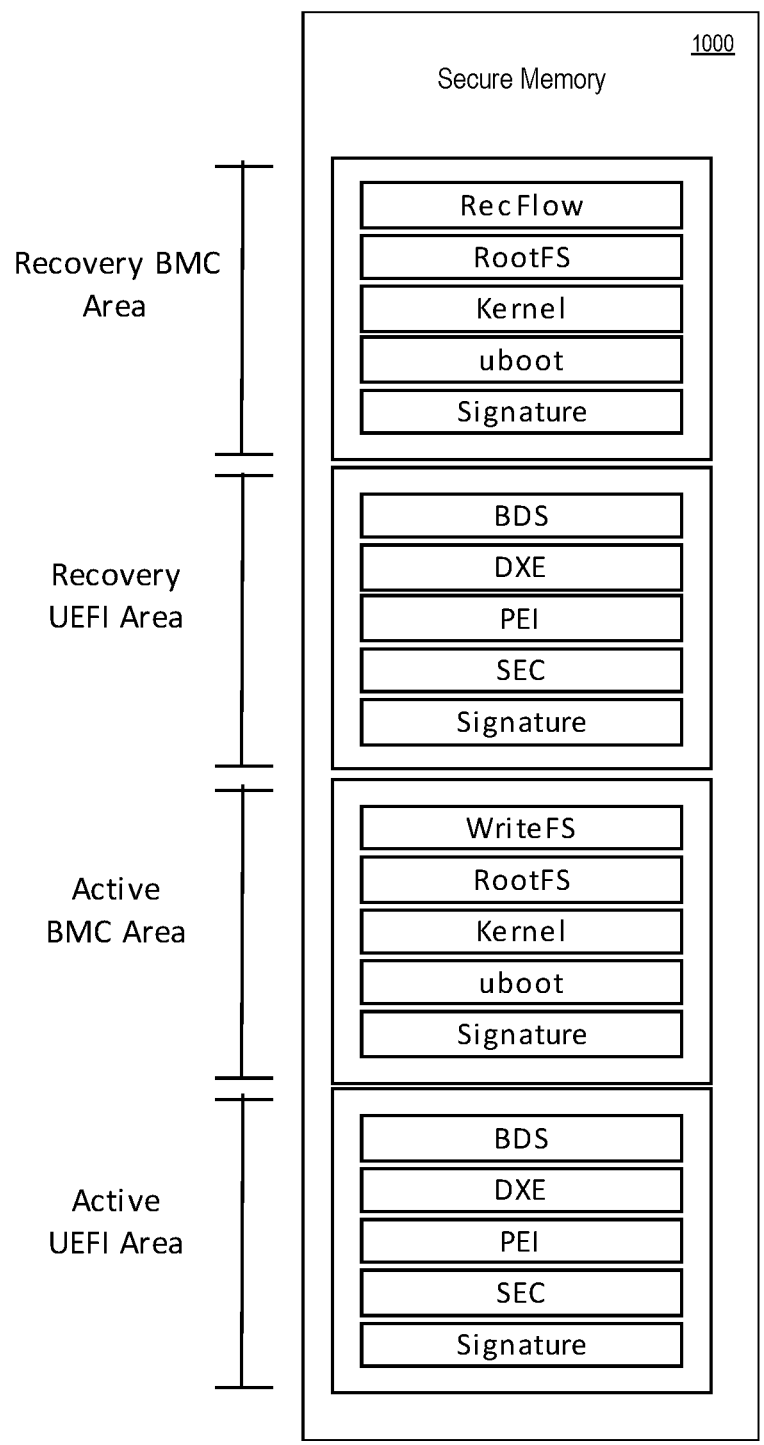
FIG. 10 is a block diagram of firmware memory areas according to some embodiments.

FIG. 10 illustrates firmware memory areas of secure memory 1000 according to some embodiments. Secure memory may comprise external flash memory such as memory 130, 330 and 335 but embodiments are not limited thereto. Memory 1000 stores both CPU (i.e., Unified Extensible Firmware Interface (UEFI)) firmware and BMC firmware.

As shown, memory 1000 includes a recovery area and an active area for each of the BMC and CPU firmware. The active areas store firmware to be authenticated and executed upon boot, while the recovery areas store an authenticated version of the firmware (i.e., either a first known good version as described above with respect to process 400, or a last known good version). If the master RoT detects corruption of active firmware (either CPU or BMC firmware), the active firmware may be replaced with the firmware of the corresponding recovery area, and the firmware is again loaded from the active area.

A RoT may prevent runtime access to each recovery area to avoid corruption thereof. A firmware memory associated with a peripheral component may also include active and recovery memory areas storing firmware of the peripheral component as described above. The RoT of the peripheral component may restrict runtime access to the recovery area.

Memory 1000 may also include a staging area to assist with firmware updates. Initially, for example, all pieces of the updated firmware are received into the flash staging area and the integrity of the updated firmware is verified as described above. If the integrity verification is successful, the updated firmware is written to the active area.

The new firmware may be corrupted during the write to the active area. Such corruption will be detected during authentication at a next firmware reload. In response to this detection, the firmware from the recovery area may be moved into the active area so as to recover the system and allow it to boot.

Figure 11:
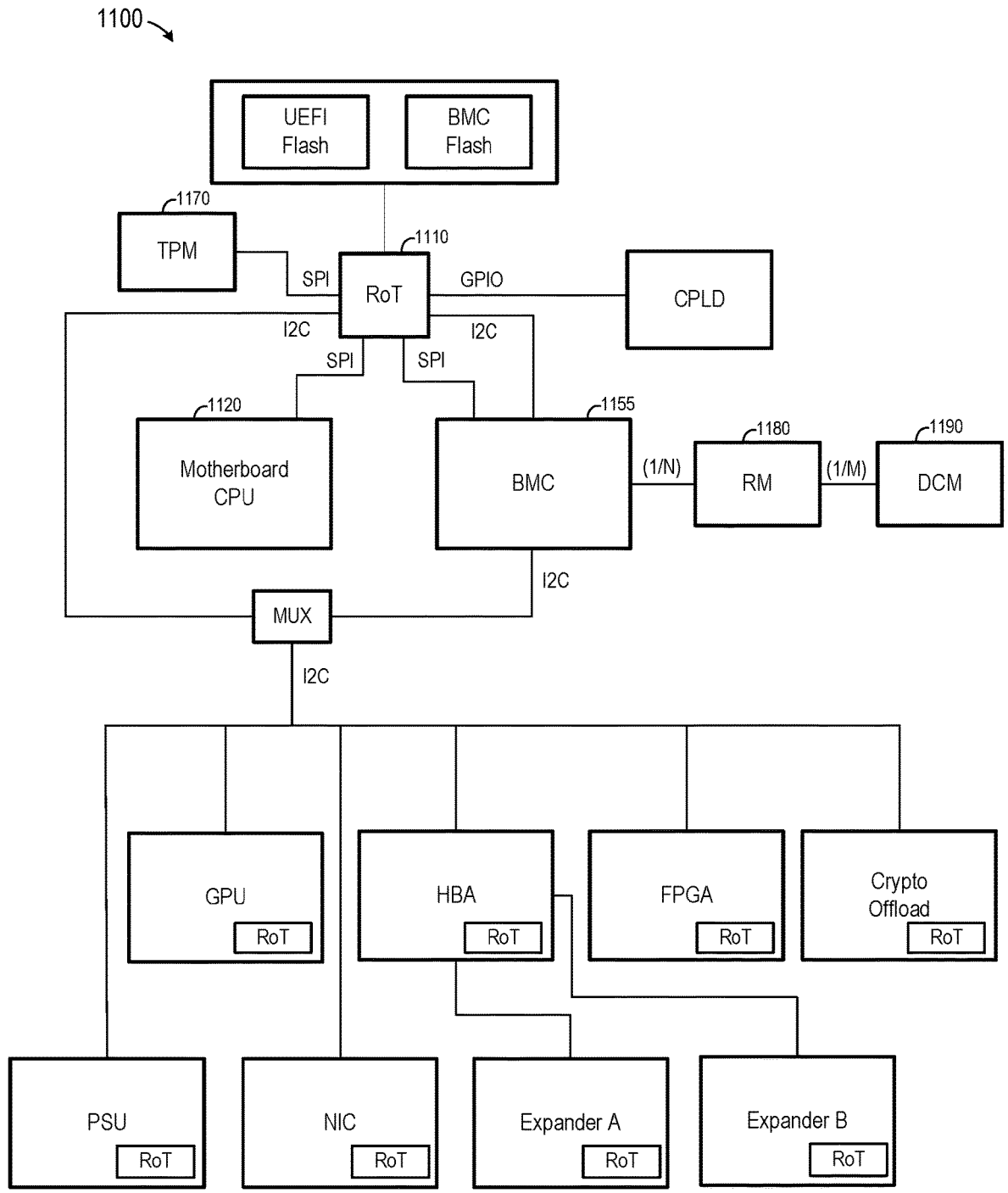
FIG. 11 is a block diagram of a server hardware architecture according to some embodiments.

FIG. 11 is a block diagram of system 1100 according to some embodiments. System 1100 is identical to system 800 except for the inclusion of Trusted Platform Module (TPM) 1170, Rack Manager (RM) 1180 and Datacenter Manager (DCM) 1190. System 1100 illustrates implementation of some embodiments within a data center server.

In particular, BMC 1155 is connected to RM 1180 via an out-of-band network connection. RoT 1110 may therefore provide attestation measurements and status to RM 1180 after BMC 1155 boots and before CPU 1120 or any attached active peripheral devices boot. This information may be used by RM 1180 to manage system 1100 and any other of N servers managed by RM 1180. RM 1180 may pass the information to DCM 1190 for controlling and monitoring the operation of the M×N servers and any other of M RMs managed by DCM 1190. After successful boot of CPU 1120, RoT 1110 may also or alternatively transmit such measurements to TPM 1170.

Figure 12:
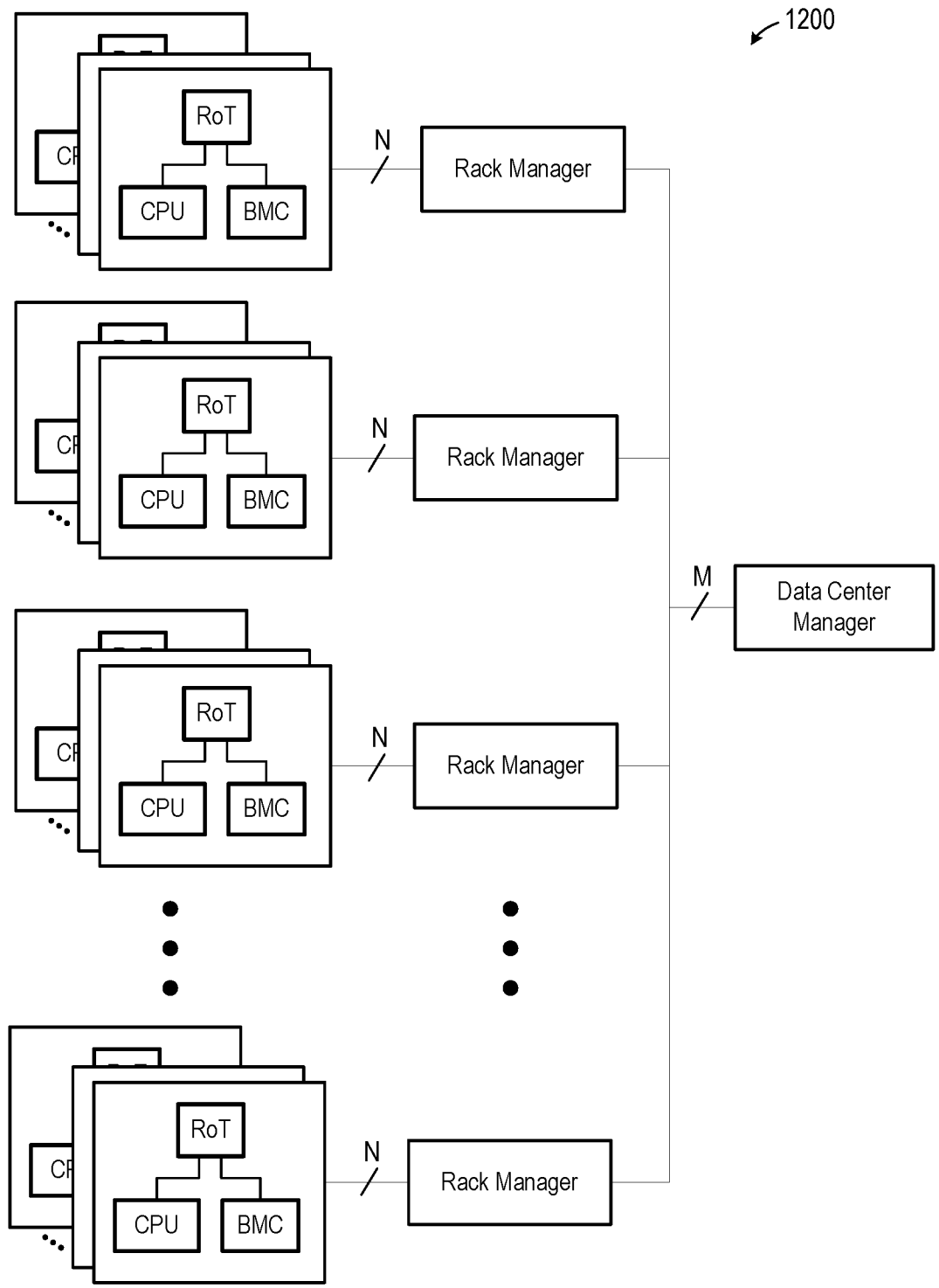
FIG. 12 is a block diagram of a data center architecture according to some embodiments.

FIG. 12 illustrates data center 1200 according to some embodiments. As shown, each rack manager is connected to N motherboards. Each motherboard includes a master RoT for authenticating the firmware of its CPU and BMC pre-boot as described herein. Each motherboard may also be coupled to peripheral active devices protected by slave RoTs and powered-on as described herein. The RoTs may operate to detect firmware integrity issues, to recover from detected firmware integrity issues, and to protect firmware regions during runtime as described.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

All processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A device comprising:
   a motherboard comprising a plurality of motherboard power rails including a standby motherboard power rail;
   a central processing unit mounted to the motherboard;
   a first microcontroller coupled to the central processing unit and mounted to the motherboard;
   a first memory coupled to the first microcontroller, mounted to the motherboard, and storing first firmware associated with the central processing unit;
   a peripheral card coupled to the motherboard and comprising a plurality of peripheral card power rails including a standby peripheral card power rail;
   a system on chip mounted to the peripheral card;
   a second microcontroller coupled to the system on chip and mounted to the peripheral card; and
   a second memory coupled to the second microcontroller, mounted to the peripheral card and storing second firmware associated with the system on chip,
   wherein, in response to receipt of power by the device, the standby motherboard power rail is energized, the first microcontroller authenticates the first firmware and, in response to successful authentication of the first firmware, the plurality of motherboard power rails are energized, the central processing unit is held in reset, the standby peripheral card power rail is energized, and the second microcontroller authenticates the second firmware, and
   wherein, in response to successful authentication of the second firmware, the second microcontroller transmits an indication of the successful authentication of the second firmware to the first microcontroller, and, in response to the indication, the plurality of peripheral card power rails are energized, the second firmware is executed by the system on chip and the central processing unit is allowed to come out of reset to execute the first firmware.

2. The device according to claim 1, further comprising:
   a second peripheral card coupled to the motherboard and comprising a plurality of second peripheral card power rails including a standby second peripheral card power rail;
   a second system on chip mounted on the second peripheral card;
   a third microcontroller coupled to the second system on chip and mounted to the second peripheral card; and a third memory coupled to the third microcontroller, mounted to the second peripheral card, and storing third firmware associated with the second system on chip, wherein, in response to successful authentication of the first firmware, the standby second peripheral card power rail is energized and the third microcontroller authenticates the third firmware and wherein, in response to successful authentication of the third firmware, the third microcontroller transmits an indication of the successful authentication of the third firmware to the first microcontroller, and, in response to the indication, the plurality of second peripheral card power rails are energized, the third firmware is executed by the second system on chip and the central processing unit is allowed to come out of reset to execute the first firmware.

3. The device according to claim 2, wherein the second microcontroller transmits an indication of the results of the authentication of the second firmware to the first microcontroller, and wherein the third microcontroller transmits an indication of the results of the authentication of the third firmware to the first microcontroller.

4. The device according to claim 3, wherein the second microcontroller transmits the indication of the results of the authentication of the second firmware to the first microcontroller over an Inter-Integrated Circuit (I²C) bus, and wherein the third microcontroller transmits the indication of the results of the authentication of the third firmware to the first microcontroller over the I²C bus.

5. The device according to claim 1, wherein the second microcontroller transmits an indication of the results of the authentication of the second firmware to the first microcontroller.

6. The device according to claim 5, wherein the second microcontroller transmits an indication of the results of the authentication of the second firmware to the first microcontroller over an Inter-Integrated Circuit (I²C) bus.

7. The device according to claim 1, wherein, if the authentication of the first firmware is successful, the first microcontroller stores the first firmware in a recovery area of the first memory.

8. The device according to claim 1, wherein in response to authentication of the second firmware by the second microcontroller, the first microcontroller controls energization of all power rails of a peripheral card to which the second microcontroller and the system on chip are mounted.

9. A device comprising:
a motherboard comprising a plurality of motherboard power rails including a standby motherboard power rail;
a central processing unit mounted to the motherboard;
a baseboard management controller mounted to the motherboard;
a first microcontroller mounted to the motherboard and coupled to the central processing unit and to the baseboard management controller;
a peripheral card coupled to the motherboard and comprising a plurality of peripheral card power rails including a standby peripheral card power rail;
a first memory coupled to the first microcontroller, mounted to the motherboard and storing first firmware associated with the central processing unit;
a second memory coupled to the first microcontroller, mounted to the motherboard and storing second firmware associated with the baseboard management controller;
a system on chip mounted to the peripheral card;
a second microcontroller coupled to the system on chip and mounted to the peripheral card;
a third memory coupled to the second microcontroller, mounted to the peripheral card and storing third firmware associated with the system on chip, wherein, in response to receipt of power by the device, the standby motherboard power rail is energized, the first microcontroller authenticates the second firmware and, in response to successful authentication of the second firmware, the first microcontroller authenticates the second firmware, and, in response to successful authentication of the first firmware, the plurality of motherboard power rails are energized, the central processing unit is held in reset, the standby power rail of the peripheral card is energized, and the second microcontroller authenticates the third firmware, and wherein, in response to successful authentication of the third firmware, the second microcontroller transmits an indication of the successful authentication of the third firmware to the first microcontroller, and, in response to the indication, the plurality of peripheral card power rails are energized, the third firmware is executed by the system on chip and the central processing unit is allowed to come out of reset to execute the first firmware.

10. The device according to claim 9, further comprising:
a second peripheral card coupled to the motherboard and comprising a plurality of second peripheral card power rails including a standby second peripheral card power rail;
a second system on chip mounted on the second peripheral card;
a third microcontroller coupled to the second system on chip and mounted to the second peripheral card; and
a fourth memory coupled to the third microcontroller, mounted to the second peripheral card, and storing fourth firmware associated with the second system on chip, wherein, in response to successful authentication of the first firmware, the second standby power rail of the second peripheral card is energized, and the third microcontroller authenticates the fourth firmware, and wherein, in response to successful authentication of the fourth firmware, the third microcontroller transmits an indication of the successful authentication of the third firmware to the first microcontroller, and, in response to the indication, the plurality of second peripheral card power rails are energized, the third firmware is executed by the second system on chip and the central processing unit is allowed to come out of reset to execute the first firmware.

11. The device according to claim 9, wherein, if the authentication of the first firmware is successful, the first microcontroller stores the first firmware in a recovery area of the first memory, and wherein, if the authentication of the second firmware is successful, the first microcontroller stores the second firmware in a recovery area of the second memory.

12. A method comprising:
receiving power at a computer system;
in response to the receipt of power:

energizing a standby power rail of a motherboard of the computer system;

authenticating, using a first microcontroller mounted on the motherboard, first firmware associated with a baseboard management controller mounted on the motherboard and coupled to the first microcontroller;

in response to successful authentication of the first firmware, powering on the baseboard management controller, authenticating second firmware of a central processing unit mounted to the motherboard and coupled to the first microcontroller using the first microcontroller, and, in response to successful authentication of the first firmware, energizing plurality of power rails of the motherboard, holding the central processing unit in reset, energizing a standby power rail of a peripheral component card coupled to the motherboard, and authenticating third firmware associated with a system on chip mounted on the peripheral component card using a second microcontroller;

in response to successful authentication of the third firmware, transmitting an indication of the successful authentication of the third firmware from the second microcontroller to the first microcontroller and in response to the indication, energizing the plurality of peripheral card power rails, executing the third firmware by the system on chip and allowing the central processing unit to come out of reset to execute the first firmware.

13. The method according to claim 12, wherein, if the authentication of the second firmware is successful, the first microcontroller stores the second firmware in a recovery area of a memory coupled to the motherboard, and wherein, if the authentication of the second firmware is not successful, the first microcontroller retrieves recovery firmware from the recovery area of the memory.

* * * * *